Sept. 3, 1929.  J. W. COX  1,726,808
CONDUIT FITTING
Filed May 20, 1925
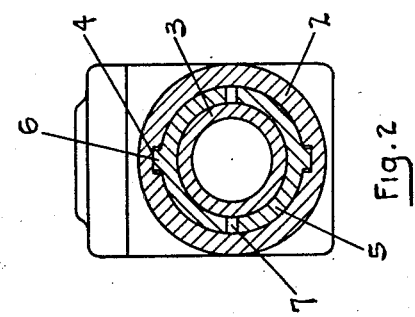
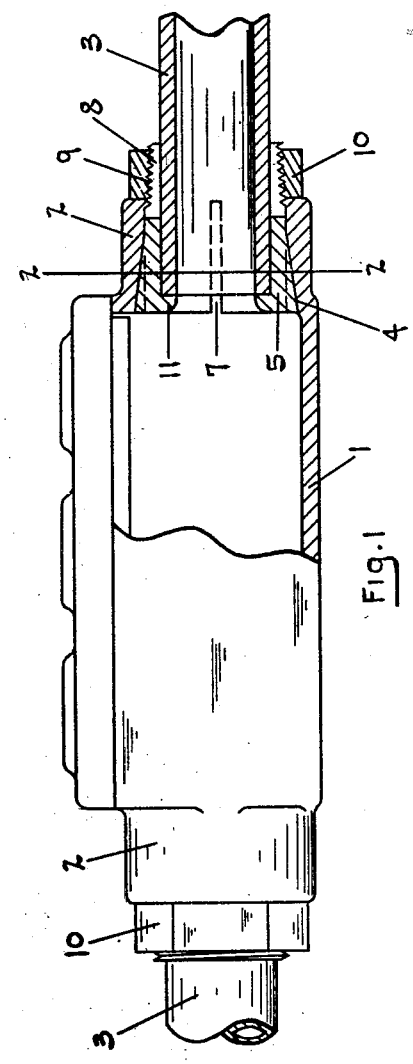
Inventor
John W. Cox
By
Attorney Patented Sept. 3, 1929.

1,726,808

UNITED STATES PATENT OFFICE.

JOHN W. COX, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed May 20, 1925. Serial No. 31,558.

This invention is designed to improve conduit fittings adapted for use with threadless conduits. In carrying out the invention I provide the body of the fitting whatever it may chance to be with an extension preferably cylindrical or approximately so, this extension having axial slots with non-wedging sides but wedging outer walls adapted to engage projections on an inserted contractible sleeve, these projections affecting the contracting of the sleeve upon an axial movement of the sleeve and at the same time preventing the turning of the sleeve in the extension. My invention further contemplates forcibly contracting both ends of the sleeve so that there may be an equal contraction and equal clamping action throughout its length. This is accomplished preferably by the tapered projection above referred to in connection with a tapered nut acting on the end of the sleeve to force the sleeve endwise. Features and details of the invention will further appear from the specification and claims.

The invention is illustrated in the accompanying drawings as follows:—

Fig. 1 shows a side elevation, partly in section.

Fig. 2 a section on the line 2—2 in Fig. 1.

1 marks the body of the fitting which is exemplified as a conduit box although the shape or purpose of the body as between the ends is not material to the present invention. 2 marks a conduit receiving extension on the body, and 3 a threadless conduit which is coupled with the body.

The inner surface of the extension is preferably cylindrical and the extension is provided with axially extending slots 4, these slots being diametrically opposite each other and having non-wedging sides but having the outer walls of the slots tapered or in the form of wedging surfaces.

A contractible sleeve 5 is arranged in the extension, the outer walls of which are approximately cylindrical and this sleeve has the outwardly extending projections 6 having a tapered or inclined outer surface adapted to act in conjunction with the tapered surface of the slots to contract the sleeve when the sleeve is drawn into the extension. The sleeve is provided with the slits 7 extending outwardly from the inner end, these slits being preferably diametrically opposite and at right angles to radial lines extending to the projections 6 so that the sleeve will readily yield and contract under the pressure of the projections 6. Similar slits 8 extend inwardly from the outer end of the sleeve, these slits being staggered relatively to the slits 7. The outer end of the sleeve is screw threaded and tapered at 9 and a nut 10 conforming to this screw thread is arranged on the outer end of the sleeve.

As the nut is advanced it draws the sleeve into the extension, thus contracting the inner end of the sleeve through the wedging action of the projections against the outer walls of the slots and at the same time the nut operating on the tapered form of the outer end of the sleeve contracts the sleeve at the outer end. In this way a uniform contraction of the sleeve throughout its length may be accomplished and as a result the conduit is more certainly clamped and where the coupling is used with a thin wall the conduit may be securely clamped without a collapse or distortion of the conduit.

The sleeve is provided with the usual guard shoulder 11 at its inner end which extends over the end of the conduit.

What I claim as new is:—

1. In a conduit fitting, the combination of a body having a conduit receiving opening; a one-piece contractible sleeve arranged in the opening, said sleeve and body having a tongue and groove connection locking the sleeve against rotation in the opening, said tongue and groove having wedge engaging surfaces adapted to contract the sleeve as the sleeve is moved axially and outwardly, and said sleeve having axial slits arranged at each side of the tongue and groove connection, said slits opening to the inner end of the sleeve; and means for forcing the sleeve axially in the opening.

2. In a conduit fitting, the combination of a body having a conduit receiving opening; a one-piece contractible sleeve in the opening, the opening and sleeve having wedge engaging surfaces at one end and the sleeve having screw threads at the opposite end; and a nut on the screw threads and operating against the body for drawing the sleeve into the opening to contract the same through the action of said surfaces, said nut and screw threads having tapered engaging portions contracting the sleeve as the nut is advanced.

3. In a conduit fitting, the combination of a body having a conduit receiving opening therein; a one-piece contractible sleeve in the opening, the opening and sleeve having a tongue and groove connection locking the sleeve against turning in the opening, the outer walls of the tongue and groove having wedge engaging surfaces adapted to contract the sleeve when the sleeve is moved in an axial and outward direction in the opening, said sleeve having slits extending into the sleeve from its inner end and at opposite sides of the tongue and groove connection and also having screw threads at its opposite end; and a nut on the screw threads and operating against the body for drawing the sleeve into the opening to contract the same through the action of the engaging surfaces, said nut and screw threads having tapered engaging portions contracting the sleeve as the nut is advanced.

In testimony whereof I have hereunto set my hand.

JOHN W. COX.